United States Patent [19]

Erwin, deceased

[11] 4,442,996
[45] Apr. 17, 1984

[54] TAPERED ROTARY PLUG VALVE

[75] Inventor: Robert L. Erwin, deceased, Farmington, N. Mex., by Josiephine Reed Erwin, Personal Representative

[73] Assignee: Josiephine R. Erwin, Farmington, N. Mex.; Personal Representative of Estate of Robert L. Erwin

[21] Appl. No.: 356,034

[22] Filed: Mar. 8, 1982

[51] Int. Cl.³ .................................................. F16K 31/44
[52] U.S. Cl. ........................................ 251/77; 251/163; 251/188
[58] Field of Search ............... 251/292, 162, 163, 188, 251/77, 215

[56] References Cited

U.S. PATENT DOCUMENTS

| | | | |
|---|---|---|---|
| 993,714 | 5/1911 | Popp | 251/292 |
| 1,669,844 | 5/1928 | Sparks | 251/309 |
| 2,705,609 | 4/1955 | Prescott | 251/162 |
| 2,711,302 | 6/1955 | McWhorter | 251/163 |
| 2,988,319 | 6/1961 | Erwin | 251/163 |
| 4,073,468 | 2/1978 | Erwin | 251/77 |

Primary Examiner—A. Michael Chambers
Attorney, Agent, or Firm—Munson H. Lane, Jr.

[57] ABSTRACT

A tapered rotary valve plug is provided with an operating head and handle assembly for rotating and axially shifting the valve plug relative to its seat. Cam means is provided to shift the operating head and valve plug axially as a unit as the head is rotated. The operating head and handle assembly are coupled for movement as a unit. The handle assembly is provided with a manually actuated locking pin whereby the handle assembly and operating head may selectively engage the valve plug for rotation to either open or closed position. When the locking pin is disengaged from the valve plug, the handle assembly remains coupled to the operating head enabling rotation of the head independently of the plug and through the aforesaid cam means the plug may be either displaced from its seat to facilitate rotation to the desired valving position or forced into a positive tight sealing engagement with its seat after movement of the plug to the desired valving position. Means are also provided for positively stopping rotation of the valve plug in either full open or closed position.

15 Claims, 13 Drawing Figures

TAPERED ROTARY PLUG VALVE

BACKGROUND AND SUMMARY OF THE INVENTION

The invention relates to improvements in rotary valve assemblies of the type shown in my U.S. Pat. No. 2,988,319 dated June 13, 1961, and U.S. Pat. No. 4,073,468 dated Feb. 4, 1978. In both of my aforesaid patents, a tapered rotary valve plug is disclosed for controlling a fluid flow path through a valve casing. To facilitate easier rotary operation of the valve plug, cam means is provided in each of my prior patents which reacts between the valve casing and the valve plug for lifting the valve plug from its seat.

In accordance with my U.S. Pat. No. 2,988,319, the cam means operates automatically to lift the valve plug from its seat during rotation of the valve plug to and from the closed and open positions.

In accordance with my U.S. Pat. No. 4,073,468, the cam means is incorporated into the valve plug actuating assembly so that rotation of the valve plug is delayed until the plug is lifted from its seat by the cam means. This is done by providing the valve plug with a separate operating head operatively coupled to the plug through a pin-and-slot connection and the provision of a spring means whereby rotation of the plug is delayed until the plug has been lifted from its seat, after which rotation of the plug is effected by the spring means.

Although both devices of the aforesaid patents have proved very successful for their purpose, the present invention improves on the details of construction in a number of ways to provide an even more effective valve assembly wherein a rotary tapered valve plug is axially displaced from its seat, rotated to the desired valving position in a floating condition and then forced tightly into sealing engagement with its seat.

The present invention eliminates the spring means as used in U.S. Pat. No. 4,073,468 which is relied on to delay rotation of the valve plug until the valve plug is lifted off its seat. This is done in the present invention by providing a novel handle assembly with a manually actuated coupling or locking pin by which the operating head and rotary valve plug are selectively coupled or uncoupled.

Also a positive sealing of the valve plug and seat is obtained in the present invention in both the open and closed positions. This is done by providing a camming action that forces the valve plug tight against the seat in both the open and closed positions by enabling the operating head to be rotated an additional increment beyond either the open or closed position of the valve plug and independently of the valve plug which is arrested against such additional rotary movement.

The above operations are made possible by reversing the taper of the valve plug and seat relative to the taper in my aforementioned patents and providing a novel handle assembly for cooperating with the operating head that has formed therein a pair of camming slots of improved design interacting with cam pins fixed to the valve casing.

The invention will be more readily understood by reference to the accompanying drawings and the following detailed description and claims.

DETAILED DESCRIPTION OF THE INVENTION

Figure 1:
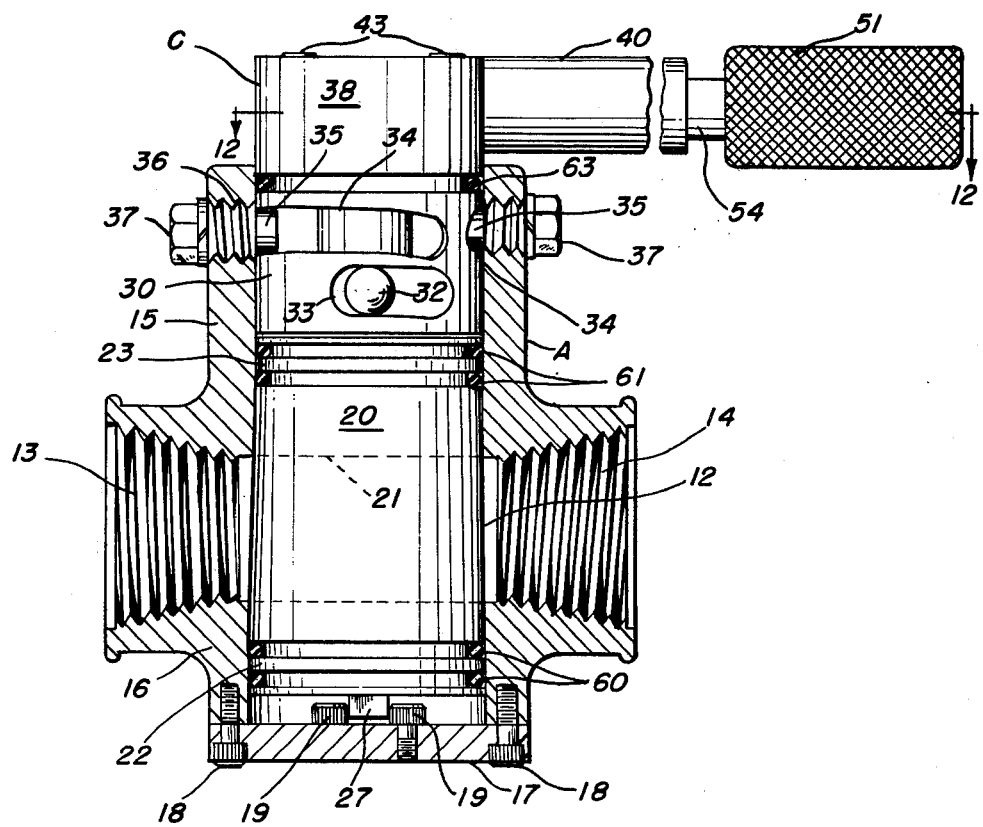
FIG. 1 is a view partly in vertical section showing the valve assembly of the present invention in an open position and with the valve plug and actuating means shown in elevation, the valve plug being fully seated.

The valve assembly denoted generally by reference numeral 10 comprises a valve casing generally designed A, a tapered valve plug generally designated B and actuating means for rotating the valve plug generally designated C.

The valve casing generally designated A includes a main casing body 11 comprising a tapered plug valve chamber 12 having an upper or minor end portion 12a and a lower or major end portion 12b. An inlet port or passage 13 leads to the valve chamber 12 and a coaxial outlet port or passage 14 leads from the chamber. The passages may be threaded for securing in any desired pipe line or conduit. Obviously either of these passages may be the inlet and the other the outlet, as desired.

A cylindrical extension portion 15 of the casing 11 is provided at the upper minor end 12a of the valve chamber and an opposite downwardly extending cylindrical extension portion 16 is provided at the lower major end 12b in axial alignment with the upper extension portion 15. The extension portion 16 is provided with a readily removable closure plate 17 secured to the extension portion by means of threaded bolts or screws 18. Stop members 19 are secured to the plate for purposes hereinafter described. The removable closure plate 17 and axial alignment of the extension portions 15,16 and valve chamber 12 permit ready insertion and removal of the valve parts for assembly and cleaning.

Figure 2:
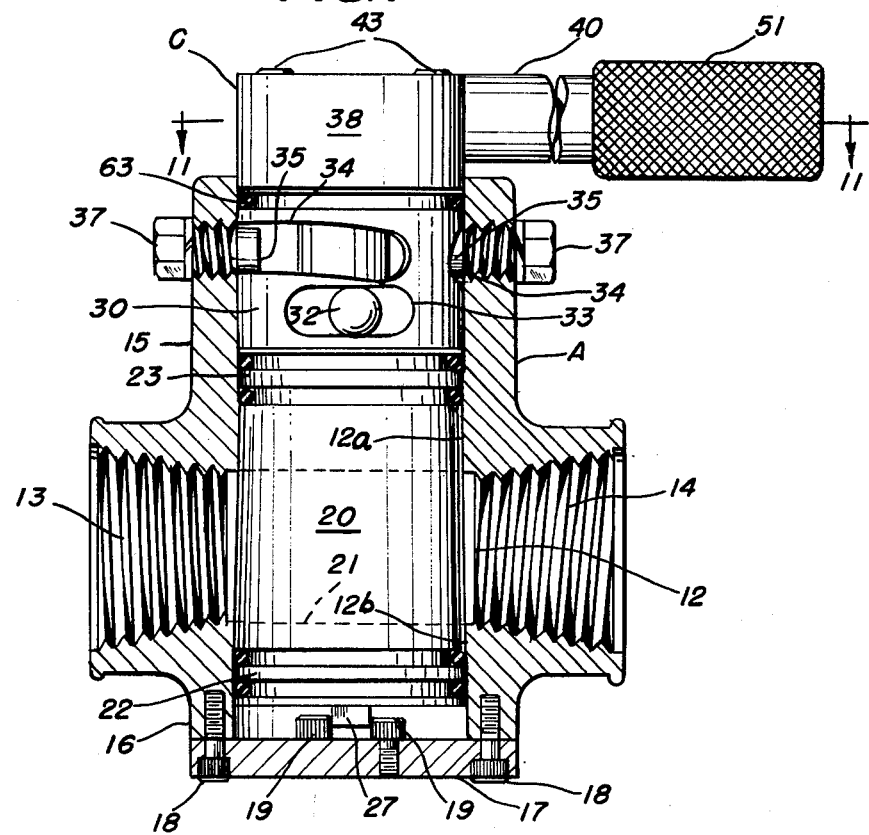
FIG. 2 is a view similar to FIG. 1 but showing the operating handle of the valve plug actuating means rotated from the position shown in FIG. 1, axially lowering the valve plug to an unseated position, but with the valve plug itself not rotated.

The valve plug generally designated B comprises a longitudinally tapered valve plug portion 20 fitting in the correspondingly tapered valve chamber 12 and is provided with an opening 21 extending through the plug portion 20 which connects passages 13 and 14 when the valve is in open position as shown in FIGS. 1 and 2 whereby fluid may flow freely through the assembly. It should be clear that when the valve plug is rotated through approximately 90° to the position shown in FIGS. 3 and 4, the opening 21 will be out of registry with the passages 13 and 14 and the valve is in closed position wherein fluid flow is arrested.

Figure 5:
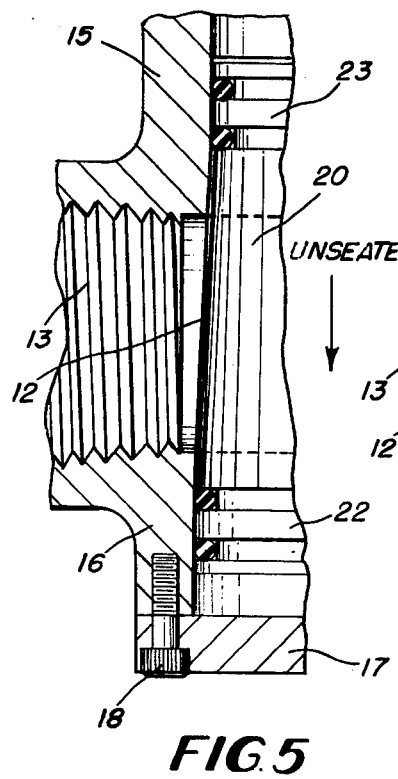
FIGS. 5 and 6 are enlarged fragmentary vertical sectional views of the valve assembly showing more distinctly the unseated and seated positions of the valve plug, the valve plug being shown in elevation.
Figure 6:
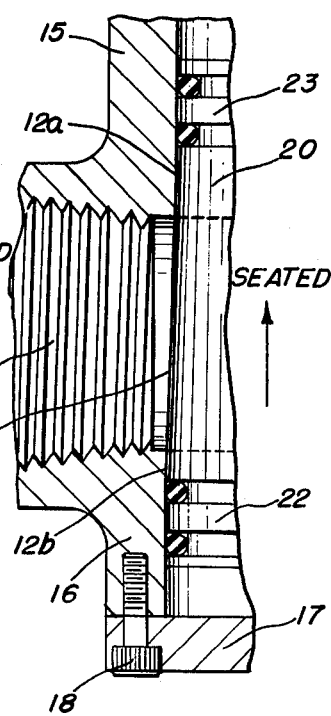
Figure 7:
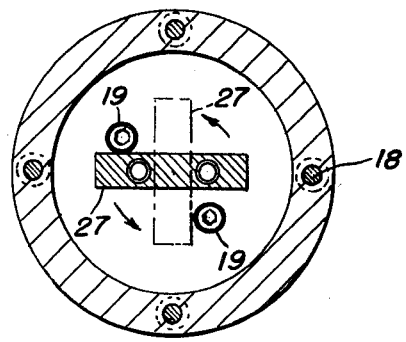
FIG. 7 is a transverse sectional view of the valve assembly taken on line 7—7 of FIG. 4.

The tapered valve plug 20 as best shown in FIGS. 5 and 6 is provided with a cylindrical major end portion 22 rotatably mounted in the lower extension portion 16 and a cylindrical minor end portion 23 rotatably mounted in the upper extension portion 15. The extension portions 15 and 16 accordingly function as bearings for the respective cylindrical portions of the valve plug. As illustrated best in FIGS. 5 and 6, the valve plug 20 in addition to being rotatable is also vertically movable within restricted limits, viz., between unseated and seated positions, in the ordinary operation of the valve. With both axial and rotational movements of the valve plug present during valving movements, the importance of the large bearing surfaces afforded by extensions 15,16 is obvious in proper centering of the valve plug and eliminating wear by dragging of the valve plug on the downstream side.

Figure 8:
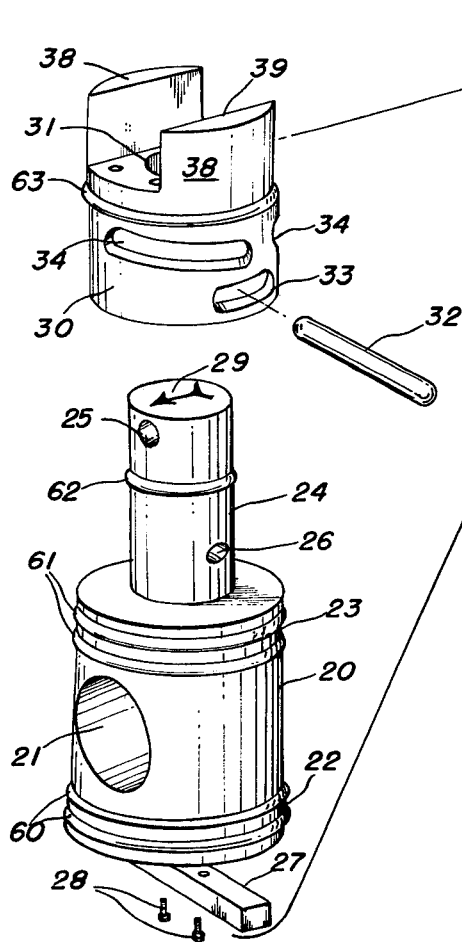
FIG. 8 is an exploded perspective view of the valve plug and actuating means.

An upstanding cylindrical shank, stem or post 24 as best shown in FIG. 8 projects from the cylindrical portion 23 of the valve plug. Openings or passages 25 and 26 extend transversely through the stem 24 for purposes hereinafter described. A transverse stop bar 27 is secured to the base of the valve plug by suitable fastener members 28 for coaction with the stop members 19 to positively limit the rotation of the valve plug. Indicia which may be in the form of a direction arrow 29 aligned with passage 21 is provided on the end face of the stem 24 for indicating the valve position.

The actuating means (best shown in FIG. 8) for rotating the valve plug and generally designated C comprises a cylindrical cap or operating head member 30 which fits over the stem 24 of the valve plug 20 and a novel operating handle assembly, generally designated 70, attached to the head.

The head 30 is rotatably positioned on the stem 24 by means of an opening 31 and the head and stem are loosely connected through a pin-and-slot connection by means of a connecting pin or rod 32 which passes through a slot 33 in the head and also passes through the opening 26 extending transversely through the stem 24. Cam tracks 34,34 are provided as in my prior aforementioned patents on the exterior surface of the operating head 30, which tracks coact with cam pins 35 extending through the wall of the cylindrical extension 15 of the valve casing. The cam pins 35 are coaxially aligned and each is provided with a screw threaded portion 36 and a flat-sided cap or head 37. The upper end of the head 30 is of fork-like configuration with upstanding portions 38 defining a transverse slot 39 for receiving and securing the handle assembly 70.

Figure 13:
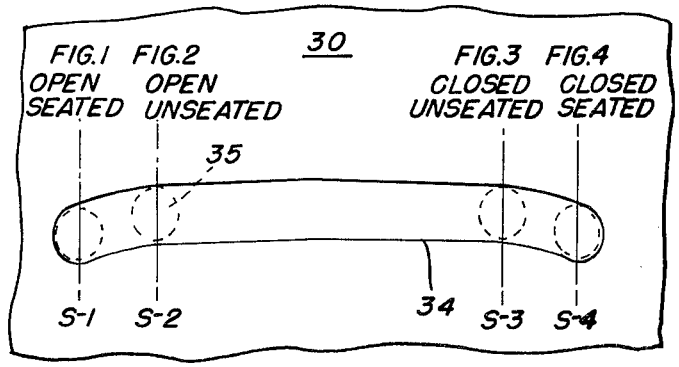
FIG. 13 is a diagrammatic view showing the arrangement of one of the cam tracks with the cam pin relationship in various valving positions.

FIG. 13 is a diagrammatic view showing the arrangement of one of the cam tracks with associated cam pin relationships in various valving positions designated S-1, S-2, etc., with the corresponding seated/unseated positions of the valve plug labeled for clarity. The terms S-1, S-2, etc., will be used to refer to the relative positioning of the cam track/pin as illustrated in FIG. 13 and it should be noted that the S-1, S-2, etc., positions correspond to the relative positioning of the cam track/pin structure as found in Stage 1, Stage 2, etc., respectively, which are described hereinafter.

As will be noted in FIG. 13, the cam tracks are curved upwardly from both ends to form a relativey shallow arch so that when the operating head 30 is at the limit of either of its rotational movements (S-1 or S-4), the cam pins will engage the relatively lower end portions of the cam tracks and upon movement of the operating head in the other direction, will cause the operating head to shift axially and through the coupling action of the connecting pin 32 cause similar vertical or axial shifting of the valve plug 20. The axial shifting of the valve plug will result in the valve plug either moving away from or toward a sealing engagement with its valve seat, i.e., an unseated or seated position. Accordingly, the correlation of the cam tracks and taper of the seating surfaces is such that in the S-1 and S-4 positions, the valve plug is fully seated and in the initial movement of the operating head away from these two positions, the camming action is such as to unseat or axially shift the valve plug away from its seat. Also considering the movement of the operating head in the opposite direction, in the final movement of the operating head toward either the S-1 or S-4 position, the valve plug will be forced into a seated position.

The axial or vertical movement of the valve plug has obvious advantages in that a more positive sealing engagement is obtained with the valve seat (FIG. 6) and in the unseated or floating position (FIG. 5), rotational movement of the valve plug is facilitated. The handle assembly permits the operating head to be coupled to the valve plug for rotational movement of the valve plug in the unseated positions (i.e., between S-2 and S-3) and to be uncoupled from the plug between the S-1 and S-2 positions and also between the S-3 and S-4 positions as will be more apparent hereinafter.

The main body 40 of the handle assembly 70 comprises a one-piece common stock of four sides which has been turned along a part of its length to provide a cylindrical portion 41 constituting a handle arm portion with the remainder sized to form a connecting end portion 42 positioned in the slot 39 and slidably engaging the upstanding portions 38 of the operating head 30. The connecting end portion 42 is secured to the head by means of a plurality of cap screws 43. An opening 44 extends through the end portion 42 in alignment with the head opening 31 to rotatably receive the end of the valve stem 24.

Figure 11:
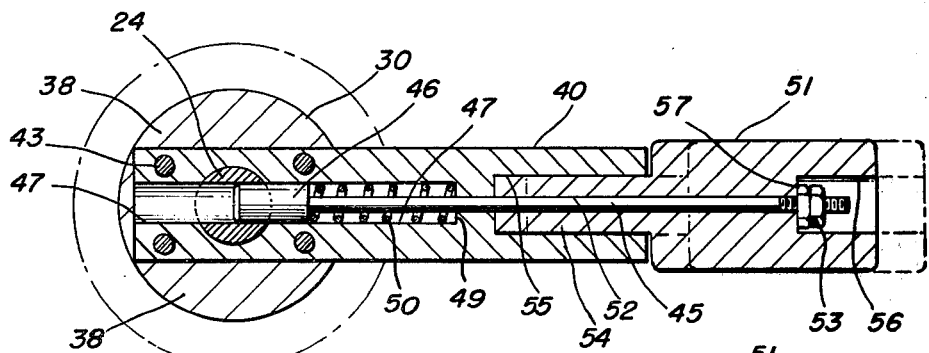
FIG. 11 is a horizontal sectional view of the actuating means taken along line 11—11 of FIG. 2.
Figure 12:
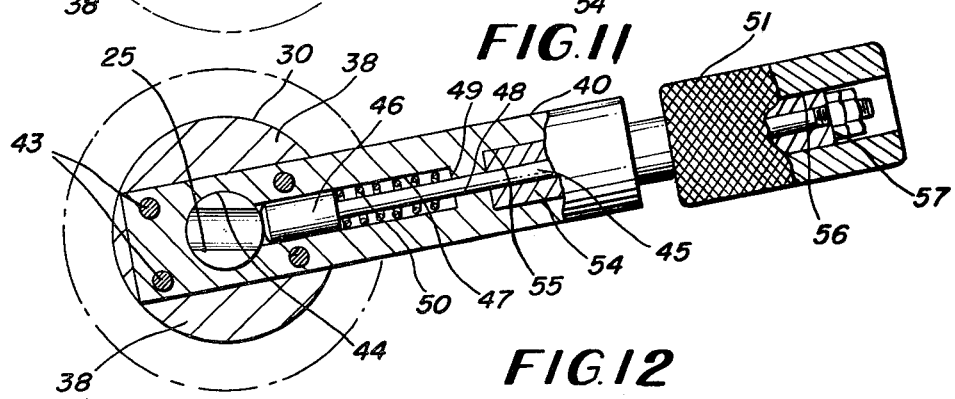
FIG. 12 is a horizontal sectional view of the actuating means taken along line 12—12 of FIG. 1.

The handle assembly 70 additionally is provided with interlocking means by which the handle assembly and operating head 30 may be selectively connected and disconnected with the stem 24 for rotation of the valve plug 20. The interlocking means is best shown in FIGS. 11 and 12 and comprises a rod member 45 with a locking pin 46 attached at one end slidably mounted in longitudinal bores 47 and 48 extending through the handle portions 41,42. An annular shoulder 49 between bores 47,48 forms a seat for a spring 50 which urges the locking pin 46 in the direction of the valve stem 24. The locking pin 46 is sized such that when the stem opening 25 and the longitudinal axis of the handle assembly are aligned, the locking pin will enter the stem opening thereby locking the handle assembly, operating head and valve plug for rotation as a unit.

Selective manual actuation of the locking pin 46 is provided by a handle member 51 mounted on the rod 45 at the outer end of same. A longitudinal bore 52 extends through the handle member 51 and slidably receives the rod which is threaded at the outer end. Nut members 53 secure the handle member 51 on the outer end of the rod. One end of the handle member 51 is in the form of a nipple 54 which is slidably mounted in a longitudinal bore 55 extending from the outer end of the cylindrical handle portion 41. A longitudinal bore 56 extending from the outer end of the handle member 51 provides a central recess receiving the outer end of the rod and nut members 53. An annular shoulder 57 between the bores 52,56 serves as a positive abutment for engagement with the nut members 53 to retract the locking pin 46 from the stem opening 25 by outward movement of the handle member 51. The nipple 54 aids in maintaining proper alignment of the handle assembly parts thereby preventing unnecessary stress on the rod 45. The shoulder 57 also serves as a positive stop by engaging the nut members and preventing excessive interlocking movement of the rod and locking pin upon registry with the stem opening 25 as shown in FIG. 11.

In order to insure against leakage of fluid, axially spaced O-rings 60 and 61 are mounted in suitable recesses formed in the cylindrical surfaces 22,23 of the valve plug 20. These O-rings serve to tightly seal the joint between the surfaces of the valve plug and body casing even when the valve plug is slightly displaced axially during its valving movement. An O-ring 62 is also provided on the stem 24 and an O-ring 63 is provided on the exterior of the head 30 to insure a fluid tight assembly.

To better understand the operation of my improved valve, four stages in the movement of the valve plug from the open position to the closed position have been illustrated and will be now described.

Figure 9:
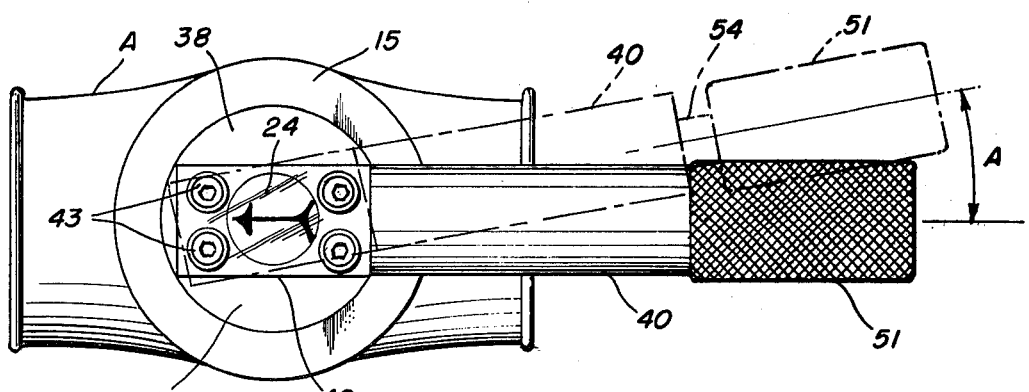
FIG. 9 is a top plan view of the valve assembly of FIG. 2 showing the valve actuating means as positioned in the valve open position and with the handle of the actuating means (in broken line) being moved to the position of FIG. 1 in which the valve plug is fully seated.

Stage 1: In stage 1, the valve assembly is in the open position as illustrated in FIG. 1 with the valve plug 20 in a tight seated position in the valve chamber 12. A brief consideration of the immediately prior actuating movement is in order. The illustrated valving position is the result of the operating head 30 and handle assembly 70 having been rotated as a unit beforehand, counterclockwise (in a top view), an additional increment after the valve plug reached an unseated valve open position. Such additional increment of rotation was independent of any valve plug rotation and through the cam means forced the valve plug into the seated position of FIG. 1. The position of the handle assembly in FIG. 1 is also illustrated in broken line in FIG. 9, the additional angular increment of rotation designated A. In this position of the handle assembly (broken line in FIG. 9), the locking pin 46 will be bearing on the exterior of the valve stem 24 and will be retracted from the stem opening 25 as illustrated in FIG. 12. From the foregoing consideration, it will be understood that to move the valve from the open position of FIG. 1 or stage 1 toward the closed position, the first step will be to rotate the handle clockwise, which rotary movement is first imparted to the operating head 30 which loosely fits over the stem 24 through the pin-and-slot connection 32,33 which permits limited rotary movement but connects the head member with the valve plug member insofar as axial movement of the plug is concerned. The rotary movement of the head 30 is accompanied by vertical movement of the valve plug 20 to an unseated or floating position due to the interaction of the cam tracks 34 and cam pins 35. Such vertical movement of the head 30 is imparted to the valve plug by reason of the connecting pin 32, and because of the pin-and-slot connection, rotary movement is not transmitted to the valve plug. Such initial rotary movement of the handle assembly and vertical movement of the valve plug will place the valve assembly in stage 2 as illustrated in FIG. 2.

Stage 2: In stage 2 as illustrated in FIG. 2, the valve handle assembly is positioned as in solid line in FIG. 9. At this stage, the locking pin 46 and stem opening 25 are in registry and the locking pin may be inserted into the stem opening either manually by manipulation of the attached rod and handle member 51 or automatically by means of the bias of spring 50. With the operating head 30, handle assembly 70 and valve plug 20 interlocked by means of locking pin 46, the head and valve plug may be rotated clockwise 90° as a unit to the valve closed position illustrated in FIG. 3 or stage 3. Engagement of the transverse bar 27 and stop pin 19 will limit rotation of the valve plug. During this rotational movement, the valve plug will remain in the unseated or floating position to facilitate rotation by reason of the interaction of the intermediate or central portion of the cam tracks 34 and associated cam pins 35.

Figure 3:
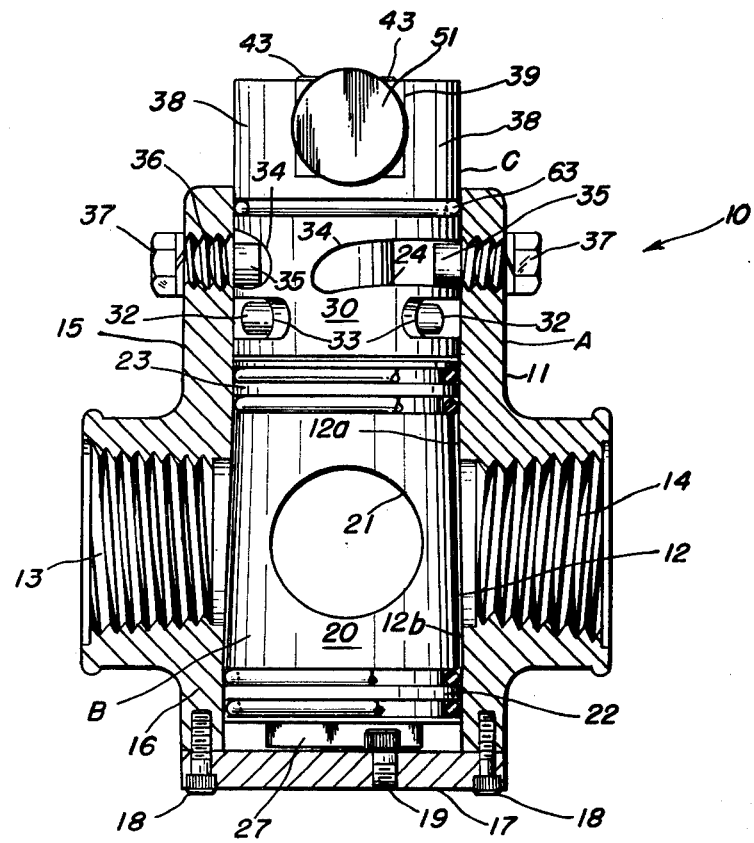
FIG. 3 is a view similar to FIGS. 1 and 2 but with the valve plug actuating means and valve plug rotated as a unit to a closed position, the valve plug remaining in an unseated position.
Figure 4:
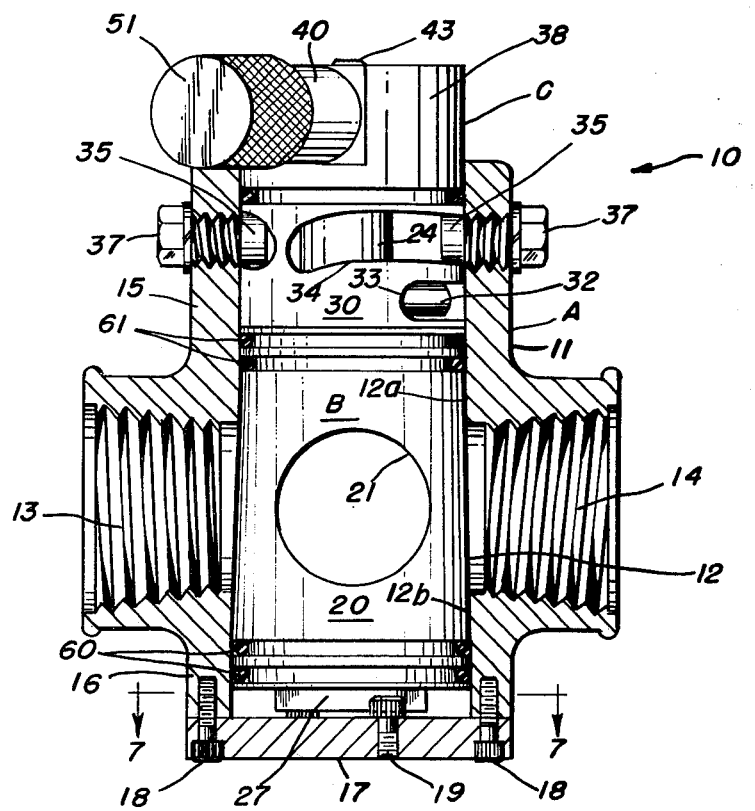
FIG. 4 is a view similar to FIGS. 1-3 but with the valve plug actuating means rotated from the position shown in FIG. 3, the valve plug having been axially lifted to a seated position, but with the valve plug itself not rotated.
Figure 10:
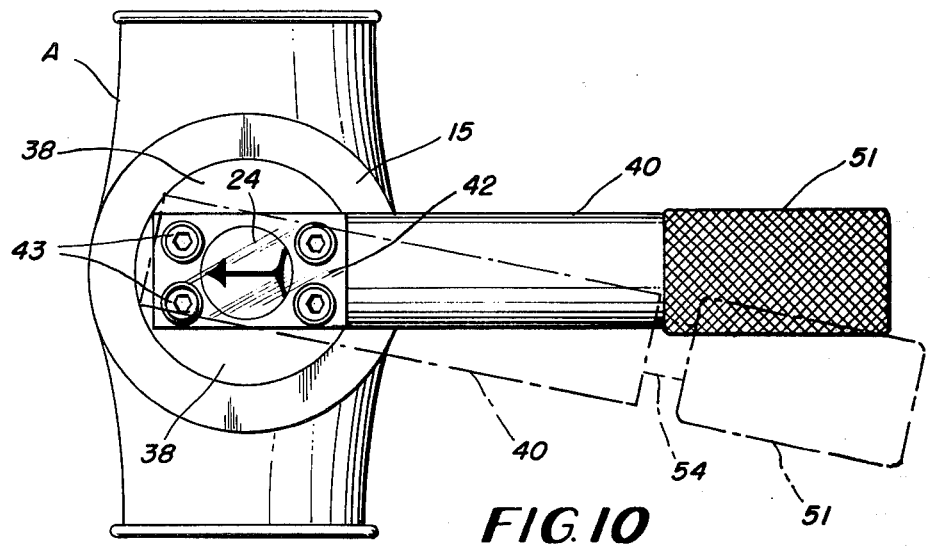
FIG. 10 is a top plan view of the valve assembly of FIG. 3 with the actuating means positioned in the valve closed position and with the handle of the actuating means (in broken line) being moved to the position of FIG. 4 in which the valve plug is fully seated.

Stage 3: In stage 3 as illustrated in FIG. 3, the valve handle assembly is positioned as in solid line in FIG. 10. In this stage, the locking pin 46 may be retracted from the stem opening 25 (as illustrated in FIG. 12) so that the operating head 30 which remains coupled to the handle assembly may be rotated clockwise independently of the valve plug (which remains in closed position). Such independent rotation of the head into its final closing position will cause the cam pins 35 to engage the lower end portions of the cam tracks 34 the interaction of which will effect vertical movement of the head 30 accompanied by vertical movement of the valve plug 20, forcing the valve plug into a tight sealing engagement with its seat in the valve chamber 12 as illustrated in FIG. 4 and herein designated stage 4.

Stage 4: In stage 4 the valve will be closed as illustrated in FIG. 4 and the handle assembly will be positioned in the manner illustrated in broken line in FIG. 10.

If now it is desired to return the valve plug to its open position, the above four stages of operation would simply be reversed. Accordingly, considering the valve assembly to be in the stage 4 valve closed position as illustrated in FIG. 4, to open the valve the handle assembly would be moved in counterclockwise direction through the several stages until the valve and handle assembly have been moved to the open position of stage 1 as illustrated in FIG. 1.

The invention has been disclosed in detail for purpose of illustration but it will be obvious that numerous modifications and variations may be resorted to without departing from the spirit of the invention as set forth in the accompanying claims.

What is claimed is:

1. A rotary plug valve comprising a tapered valve plug, valve plug actuating means including a rotary and axially movable plug operating head distinct from said valve plug, a valve casing including a tapered valve chamber for receiving said tapered valve plug, said valve chamber having inlet and outlet ports communicating therewith and a first cylindrical extension for mounting said rotary and axially movable plug operating head for rotation and axial movement therein, cam means responsive to rotation of the operating head for imparting axial movement to the head when the head is rotated, said valve plug rotatably fitting within said tapered valve chamber and being provided with a transverse passage for communicating with the inlet and outlet ports when the valve is in open position, first means interconnecting the operating head and valve plug to provide axial movement to the plug when the head is axially moved by coaction of said cam means and said head when said head is rotated and second means interconnecting the operating head and valve plug to provide in a disconnected position of said operating head and said valve plug rotational movement of the operating head independent of the valve plug or in a connected position rotational movement of the operating head and valve plug as a unit.

2. A rotary plug valve as set forth in claim 1 wherein the valve casing includes a second cylindrical extension in axial alignment with the first cylindrical extension and on the opposite side of the casing, and the valve plug is provided with cylindrical portions rotatably and slidably journalled in said cylindrical extensions.

3. A rotary plug valve as set forth in claim 2 wherein each cylindrical portion of the valve plug is provided with axially spaced O-rings to seal the joint between the cylindrical portions and valve casing.

4. A rotary plug valve as set forth in claim 2 wherein the second cylindrical extension is provided with an end plate, and coacting stop means are provided on said valve plug and end plate respectively to limit rotation of the valve plug.

5. A rotary plug valve as set forth in claim 1 wherein the cam means comprises a cam track on the exterior of the operating head and a pin extending through the casing into said track.

6. A rotary plug valve as set forth in claim 5 wherein each cam track and pin has a counterpart on the opposite side of the valve axis, each cam track extending circumferentially around the head and curved upwardly in the form of a flat arch from both ends, the pins being positioned in the end portions of the associated track in the valve open and closed positions so that upon initial rotation of the operating head from either the valve open or closed position said axial movement is imparted to the head and plug to displace the plug from its seat and on final rotation to either of said valve positions, to force the plug into tight sealing engagement with its seat.

7. A rotary plug valve as set forth in claim 1 wherein the operating head and valve plug are connected by a pin-and-slot connection providing for limited rotary movement between the head and plug and comprising said first interconnecting means.

8. A rotary plug valve as set forth in claim 1 wherein the valve plug is provided with a stem portion and said operating head comprises a cap fitting over said stem, said first interconnecting means comprising a pin-and-slot connection wherein the cap is provided with slots and a rigid pin projects through said stem with its ends slidable in said slots.

9. A rotary plug valve as set forth in claim 1 wherein the valve casing includes a second cylindrical extension in axial alignment with the first cylindrical extension and on the opposite side of the casing, said second extension having a removable end plate whereby said rotary valve plug may be readily inserted into or removed from the valve casing through the second extension for assembly and cleaning.

10. A rotary plug valve as set forth in claim 1 which includes means for positively limiting the rotation of the valve plug in either direction to the fully open or fully closed position.

11. A rotary plug valve as set forth in claim 1 wherein said second interconnecting means comprises a handle assembly operatively coupled to the operating head and provided with pin means selectively interconnecting the operating head and valve plug.

12. A rotary plug valve as set forth in claim 11 wherein the pin means is slidably mounted within the handle assembly and is provided with a spring bias urging the pin means into interlocking engagement with the valve plug.

13. A rotary plug valve as set forth in claim 11 wherein said selective operation of the pin means is provided by a handle member mounted on the outer end of the pin means, said handle member being provided with abutment means for engaging the pin means to move the pin means out of locking engagement with the valve plug and to limit movement of the pin means into such engagement.

14. A rotary plug valve as set forth in claim 11 wherein said head is provided with a fork-like end portion including upstanding portions defining a slot for receiving and securing the handle assembly.

15. A rotary plug valve as set forth in claim 11 wherein the cam means comprises a cam track on the exterior of the plug operating head and a cam pin extending through the casing into said track, the configuration of the cam track being such that upon initial rotation of the operating head from either the valve open or closed position said axial movement is imparted to the head and plug to displace the plug from its seat and on final rotation to either of said valve positions, to force the plug into tight sealing engagement with its seat.

* * * * *